United States Patent [19]

Sullivan

[11] 4,112,755
[45] Sep. 12, 1978

[54] "STRAPDOWN" INDUCTION COMPASS TRANSMITTER WITH MEANS TO COMPENSATE FOR HEADING ERRORS DURING TURNS AND DURING DIVES AND CLIMBS DUE TO THE VERTICAL COMPONENT OF THE EARTH'S MAGNETIC FIELD AND DUE TO TWO CYCLE ERROR

[76] Inventor: Gerald Leslie Sullivan, 24 Scollay Cir., Salem, Rockingham, N.H. 03079

[21] Appl. No.: 752,064

[22] Filed: Dec. 20, 1976

[51] Int. Cl.² .......................................... G01C 21/00
[52] U.S. Cl. .................................. 73/178 R; 33/356; 318/633; 318/647
[58] Field of Search ................. 33/326, 356, 357, 361; 73/178 R; 235/150.2, 150.25, 105.26, 186; 244/175, 179; 318/629, 633, 647, 654, 661; 340/197, 347 SY; 324/43 R, 47, 48

[56] References Cited
U.S. PATENT DOCUMENTS

| 3,628,254 | 12/1971 | Burmeister | 33/357 |
| 3,678,593 | 7/1972 | Baker et al. | 33/361 |
| 4,006,631 | 2/1977 | Garner | 33/356 X |

Primary Examiner—Stephen G. Kunin

[57] ABSTRACT

The invention relates to an apparatus for compensating a "strapdown" induction compass transmitter to eliminate heading errors during turns, and during climbing and diving maneuvers which are due to the vertical component of the Earth's magnetic field as well as those due to the horizontal component of the Earth's magnetic field perpendicular to the axis of tilt. Instabilities and anomalies such as "Northerly Turning Error" which are due to the vertical field are thus eliminated or minimized as is two cycle error which is due to the Earth's horizontal field during these same maneuvers. The vertical field compensating signal during turns is proportional to the product of the Earth's magnetic field, M the sine of the dip angle D and the sine of the bank or roll angle φ. The vertical field pitch compensating signal while climbing or diving is proportional to the product of the sine of the pitch angle θ, the Earth's magnetic field M and the sine of the magnetic dip angle D. These compensating signals are used to drive current through the transmitter sensing windings to produce flux which opposes and cancels the flux sensed by the compass transmitter windings due to the vertical component of the Earth's field. Compensating signals for two cycle errors due to the horizontal component of the Earth's field are proportional to cosine of the tilt angles, i.e., the roll angle φ and the pitch angle θ are provided to control the feedback current through the sensing windings to cancel the two cycle error.

5 Claims, 3 Drawing Figures

"STRAPDOWN" INDUCTION COMPASS TRANSMITTER WITH MEANS TO COMPENSATE FOR HEADING ERRORS DURING TURNS AND DURING DIVES AND CLIMBS DUE TO THE VERTICAL COMPONENT OF THE EARTH'S MAGNETIC FIELD AND DUE TO TWO CYCLE ERROR

The instant invention relates to a magnetic heading reference system and more particularly to one utilizing a "strapdown" induction compass transmitter which is compensated to minimize or eliminate heading errors due to Earth's vertical field and to eliminate two cycle error.

Normally, the heading output for an aircraft compass system is obtained from a directional gyro whose heading is slowly corrected to agree with the heading provided by an induction compass transmitter. This type of directional heading output system is complementary in that the short term stability and accuracy of the gyroscope is combined with the long term accuracy of the compass transmitter so that the overall system incorporates the best features of each. One class of induction compass transmitters used as aircraft magnetic references are pendulous in order to assure that the sensing element (i.e., the magnetometer windings) remains horizontal during non-accelerating straight flight within the pendulous tilt freedom of the device (which is normally in the range of ± 27°). Under these conditions the induction compass accurately senses the horizontal component of the Earth's magnetic field and is insensitive to the vertical component of the Earth's field.

In a typical induction compass transmitter, the horizontal component H of the Earth's magnetic field M is resolved along the ship's axes and can then be sensed and utilized to produce an output signal which represents the heading of the aircraft with respect to magnetic North. Thus, the Earth's horizontal component H can be resolved along the aircraft fore/aft (roll) and athwartships (pitch) axes so that the heading indicated by the compass transmitter is then represented by the arc-tangent of the athwartships component $H_p$ of the Earth's horizontal field divided by the fore/aft component $H_R$ as sensed in the plane of the sensing elements.

However, because of the pendulous suspension, the induction compass transmitter is susceptible to tilt during turns and during linear acceleration of the aircraft. This, in turn, produces errors in the sensed direction of magnetic North and in indicated heading. That is, any acceleration due to speed change, or the centripetal acceleration imposed during a turn, causes the plane of the sensing elements of the compass transmitter to be displaced from the horizontal. Thus, during a coordinated turn, the pendulous element assumes a lateral tilt angle which agrees with the bank angle of the aircraft; or becomes some other lateral angle if the turn is not coordinated. In the case of acceleration or deceleration due to speed changes, the pendulous element is tilted in a vertical plane so as to simulate the effects of rotation about the pitch axis. Because of the tilting of the plane of the compass transmitter under these conditions, not only is the sensed horizontal component normally reduced, but in addition, a component of the Earth's vertical field is sensed. If the compass is "strapped down," i.e., non pendulous and rigidly secured to the aircraft frame, on the other hand, there is no tilt during acceleration due to speed changes, but the compass also tilts during climbs and dives. The vertical Earth's field component is therefore sensed along the athwartships axis during turns and along the fore/aft axis during climbs or dives. This sensed vertical component adds vectorially to the sensed horizontal field component and, in the general case, results in erroneously sensing of magnetic North.

Tilt of the induction compass sensing element produces errors from a combination of two causes.

The first of these is a two cycle error which is developed whenever there is a component of the Earth's horizontal magnetic field perpendicular to the axis of tilt together with a component along the axis of tilt. The perpendicular component is reduced in magnitude as a function of the angle of tilt when projected on to the plane of the sensing coil. This reduced component when recombined with the unchanged horizontal component measured along the axis of tilt produces an apparent vectorial shift in the sensed direction of the field in the plane of the coil. Two cycle error is a function of both the heading angle $\Omega$ and the angle of tilt (bank angle $\phi$ or pitch angle $\theta$). It has the same magnitude for all magnetic field dip angles D and is normally small.

The other tilt induced error occurs because the vertical component of the Earth's magnetic field projects on the plane of the tilted coils and adds vectorially to the sensed horizontal component. This vertical field error, however, varies with magnetic field dip angle D, and as a result, can vary widely. An angular tilt about the aircraft axis during turns causes this second error source to produce what is termed "Northerly Turning Error" and can induce heading anomalies and ambiguities as well as a continuous oscillation when attempting to straighten out on a northerly heading when in the Northern Hemisphere, and similarly, when attempting to straighten out on a southerly heading in the Southern Hemisphere. The nature of this error which is due to the vertical component of the Earth's magnetic field as the aircraft turns, may be more clearly understood by considering the following:

Assume that an aircraft in a coordinated right turn attempts to level out on a North heading using the induction compass transmitter, whether pendulous or "strapdown" as a reference. The compass transmitter tilts to the same right wing down attitude as does the aircraft. When on a North heading, a portion of the Earth's vertical field vector now passes from West to East in the plane of the compass transmitter, vectorially adding to the actual sensed horizontal component and making it appear that magnetic North is to the East of its actual location. Consequently, the aircraft continues to turn beyond North before levelling off. Once level, North is now correctly indicated to be to the West and the aircraft must go into a left bank for a heading correction. A portion of the Earth's vertical field vector now pases from East to West in the plane of the compass transmitter, vectorially adding to the actual sensed horizontal component in the opposite sense thereby making it appear as if North is to the West of its actual location. Again, the aircraft continues to turn beyond true magnetic North before levelling off. This situation continues making it virtually impossible to obtain or maintain the desired constant North heading.

It is customary, therefore, in conventional slaved aircraft compass systems to interrupt compass slaving during turns in order to avoid the oscillating condition about the northerly heading. This vertical field error often causes the compass mode of operation (available on some compass systems for emergency use when a directional gyro has failed) to become literally useless during turns unless dip angle is relatively small. Since dip angle in the middle of the Continental U.S. is approximately 70°, it can be seen that this is a serious problem in aircraft navigation.

Similar errors are also developed in pendulously mounted compass transmitters during acceleration due to speed changes because the pendulous compass transmitter tilts about the aircraft pitch axis. For most aircraft large tilt angles which are associated with large accelerations are of a relatively short duration so that the problem is normally somewhat less severe than that which occurs during turns of the aircraft. Even so, compass slaving is frequently disconnected on aircraft during acceleration to prevent error buildup. Again, compass mode operation during acceleration may also be severely affected.

A "strapdown" induction compass transmitter, as pointed out previously, is not tilted because of acceleration due to speed changes. It is, however, affected by the Earth's vertical field component while climbing or diving. During a climb, a portion of the Earth's vertical field vector passes from fore to aft in the plane of the compass transmitter, vectorially adding to the actual horizontal component sensed along the fore/aft axis thereby making it appear that magnetic North is to the East of its actual location when heading West in the Northern Hemisphere. During a dive, on the other hand, a portion of the Earth's vertical field passes from aft to fore in the plane of the compass transmitter vectorially adding to the actual sensed horizontal component in the opposite sense. As a result, indicated heading shows North to the West of its actual location.

In a recently filed application entitled "A Strapdown Induction Compass Transmitter with Compensation for Heading Errors due to the Vertical Component of the Earth's Magnetic Field during Turns and during Dives or Climbs" Ser. No. 729,411, filed: Oct. 4, 1976 in the name of Gerald Leslie Sullivan, which application is assigned to the General Electric Company, the assignee of the present invention, a "Strapdown" induction compass transmitter is described which is compensated for errors introduced by the vertical component of the Earth's magnetic field during turning, climbing and diving maneuvers. In the arrangement described in the above identified Sullivan application, DC compensating signals proportional respectively to M sin D sin $\phi$ and M sin D sin $\theta$ are generated and utilized to drive current through the athwartships sensing and fore/aft sensing windings of the compass transmitter to generate flux fields which cancel the sensed flux field due to the vertical component of the Earth's magnetic field during turns, in the case of the athwartships sensing windings, and during climbs and dives in the fore/aft sensing windings. In the arrangement described in the aforesaid Sullivan application, the compensating signal is generated without having to sense the vertical field directly. It is generated by producing a signal proportional to the product of the Earth's magnetic field M, the known dip angle D and the bank or pitch angles ($\phi$ or $\theta$) during the respective maneuvers. These signals are equal to the induced vertical field errors V sin $\phi$ and V sin $\theta$. The current driven through the windings by these compensating signals cancels the vertical field. As a result, the output from the induction compass transmitter during turns and during climbs and dives is essentially free of errors due to the vertical component of the Earth's magnetic field thereby minimizing or eliminating hemispherical turn errors or anomalies of the type usually referred to as "Northerly Turning Errors." This, in turn, makes it possible to use the magnetic compass system which is driven by the induction compass transmitter for heading or control purposes without the need of a directional gyroscope.

While the arrangement described in the aforesaid Sullivan application is very effective in compensating for heading errors due to the vertical component of the Earth's magnetic field during maneuvers such as turns, climbs and dives, it does not compensate for the so-called two cycle error which is due to the horizontal component of the Earth's magnetic field perpendicular to the axis of tilt during these maneuvers. In most instances, as pointed out in the aforesaid Sullivan application, the two cycle error is ignored since it is small compared to the errors due to the vertical component of the Earth's field which varies with magnetic dip angle, which in turn, varies with latitude. However, in some instances, it may be desirable to compensate the output signal from the induction compass transmitter to eliminate not only heading errors due to the vertical field component but also to eliminate two cycle errors.

It is therefore a principal objective of the invention to produce an arrangement for compensating a "Strapdown" induction compass transmitter to eliminate heading errors during turning, climbing and diving maneuvers caused by the vertical component of the Earth's magnetic field and to eliminate two cycle errors caused by the horizontal component of the Earth's magnetic field.

Another objective of the invention is to provide a compensated "Strapdown" induction compass transmitter in which heading errors induced by the horizontal and vertical components of the Earth's magnetic field during various maneuvers are eliminated directly within the compass transmitter windings.

Other objectives and advantages of the instant invention will become apparent as the description thereof proceeds.

In accordance with one aspect of the invention, vertical field error compensating signals are generated (without sensing the vertical field directly), from the dip angle at a given latitude, the Earth's magnetic field M, and the tilt angles $\phi$ and $\theta$. That is, the compensating signals are respectively proportional to M sin D sin $\phi$ and M sin D sin $\theta$. These signals which are equal to the vertical field errors (V sin $\phi$ and V sin $\phi$) induced respectively, in the athwartships sensing winding during turns and in the fore/aft sensing windings during non-turning climbs or dives. These signals are used to generate currents which are fed back respectively through the athwartships and the fore/aft field sensing windings to produce fluxes which cancel the effects of the vertical compontnt of the Earth's magnetic field on these windings during these maneuvers. The second harmonic output signals from the sensing windings of the induction transmitter though compensated for vertical field errors are still subject to two cycle error which is proportional respectively to the cosine of the bank angle $\phi$ and the cosine of the pitch angle $\theta$. These second harmonic signals are synchronously demodulated in individual null balanced closed loop demodulating networks. The DC outputs from the demodulators are applied to a negative feedback path in each of the demodulating networks. These negative feedback signals drive currents through the individual sensing windings. At null balance the effect of the external field is completely nullified or cancelled by the negative DC feedback current. At null balance therefore, the DC output voltage from the demodulating networks required to produce a cancelling current is a measure of external field strength. In accordance with the invention, the two cycle errors in each of the athwartships and fore-/aft signals are corrected in the demodulating network by inserting a multiplying network in each of the negative feedback paths and applying a correction signal proportional to $\cos \phi$ or $\cos \theta$ the negative feedback paths of the athwartships and fore/aft demodulating networks to cancel two cycle error. Consequently, the DC output from the demodulator networks is now proportional to the actual Earth's magnetic field horizontal components since the vertical field error as well as the two cycle error has been cancelled.

The novel features which are believed to be characteristic of this invention are set forth with particularity in the appended claims. The invention itself however, both as to its organization and mode of operation, together with further objectives and advantages may best be understood by reference to the following description taken in connection with the accompanying drawings in which:

Figure 1:
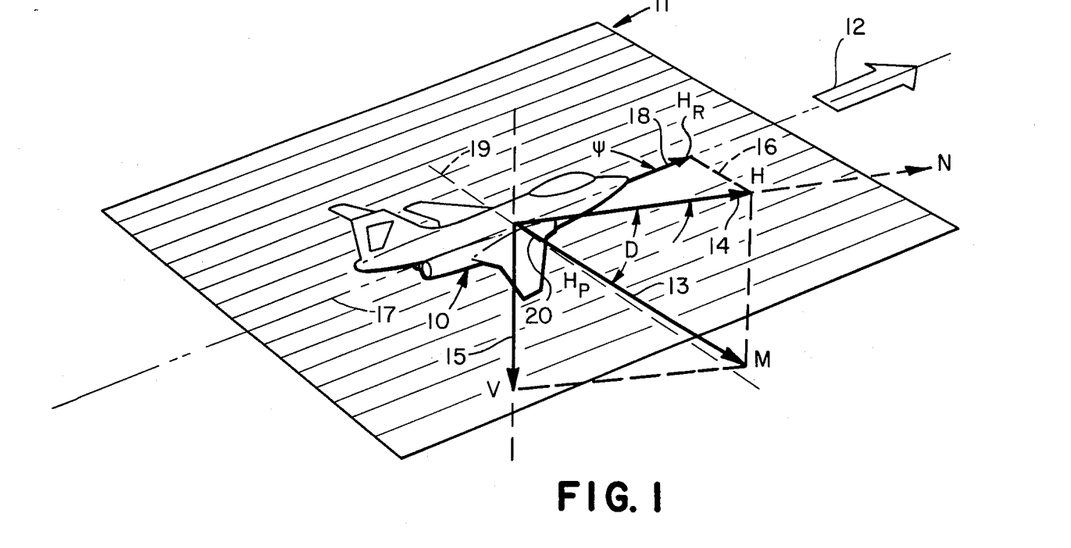
FIG. 1 is a perspective depiction of an aircraft during level flight in the horizontal plane and shows the relationship between the Earth's magnetic field M, magnetic dip angle D, and the aircraft axes.

In order to understand the manner in which the instant invention is used to compensate a "strapdown" induction compass transmitter to reduce or eliminate heading errors caused by the vertical and horizontal components of the Earth's magnetic field, it will be revealing to discuss initially the relationship between the Earth's magnetic field and the magnetic field components sensed by a "strapdown" induction compass both in level flight, during level turns, and during climbs and dives when tilting of the aircraft axes and of the compass transmitter produces changes in the sensed field. Thus, FIG. 1 illustrated an aircraft 10 in level flight in a horizontal plane (illustrated generally at 11) in a direction shown by the arrow 12 which, in the particular instance, is shown to be a westerly heading with respect to magnetic North N. The heading indicated by a "strapdown" induction compass transmitter, during straight flight, represents direction of the aircraft with respect to the North directed horizontal component H of the Earth's magnetic field M. The Earth's magnetic field M is a vector quantity shown at 13 consisting of a North directed horizontal component H shown at 14 and a vertical component V shown at 15. The angle measured from the horizontal component H to the Earth's magnetic field vector M is termed the dip angle D, with the dip angle being considered positive when the Earth's magnetic field dips below the horizontal, as it does in the Northern Hemisphere. Consequently, the vertical component of the Earth's magnetic field is considered positive when directed downward. The direction of the Earth's magnetic field M, i.e., the dip angle D, varies with latitude with the dip angle being zero (0°) at the magnetic equator and becoming 90° at the North magnetic pole. The analytical relationship between the Earth's magnetic field and the horizontal and vertical components of that field are therefore as follows:

$$H = M \cos D \tag{1}$$

$$V = M \sin D \tag{2}$$

$$\text{Tan } D = V/H \tag{3}$$

Aircraft magnetic heading is defined as a horizontal angle $\Omega$ (positive in a clockwise direction from magnetic North) shown generally at 16, between the horizontal projection of the aircraft fore/aft or roll axis shown at 17, and magnetic north. The horizontal component of the Earth's magnetic field may, in turn, be resolved along the aircraft axes of two orthogonal horizontal components $H_R$ and $H_P$ which are functions of magnetic heading angle $\Omega$. $H_R$ is a component parallel to the horizontal projection 17 of the aircraft fore/aft or roll axis and is shown by the dashed arrow 18 and is considered positive when directed forward, as illustrated. $H_P$ is a component parallel to the horizontal projection 19 of the aircraft athwartships or pitch axis. $H_P$ is shown by the dashed arrow 20 and is considered positive when directed to port. With the westerly heading shown in FIG. 1 the sensed athwartships component 20 is directed to starboard and is therefore considered to be negative.

The analytical relationships between the orthogonal horizontal field components $H_R$ and $H_P$ along the aircraft axes, the heading angle $\Omega$ and the horizontal component H of the Earth's magnetic field may be defined as follows:

$$\Omega = \text{actual magnetic heading}$$
$$H_P = H \sin \Omega \tag{4}$$

$$H_R = H \cos \Omega \tag{5}$$

$$\text{Tan } \Omega = H_P/H_R \tag{6}$$

The heading indicated by an induction compass transmitter which has a plurality of windings to sense the athwartships and the fore/aft component of the horizontal component of the Earth's magnetic field may generally be represented by the arc tangent of the athwartships (positive to port) component A of the Earth's magnetic field divided by the fore/aft (positive forward) component F of the Earth's field as sensed in the plane of the coils or windings of the compass transmitter. When the aircraft is in level flight in the horizontal plane as shown in FIG. 1 the two orthogonal components of the horizontal field H are sensed accurately and produce an accurate magnetic heading indication. Furthermore, with the aircraft in level flight, the vertical component V of the Earth's field as illustrated at 15 is not sensed in the plane of the compass transmitter sensing windings and has no effect on the magnetic output heading.

Figure 2:
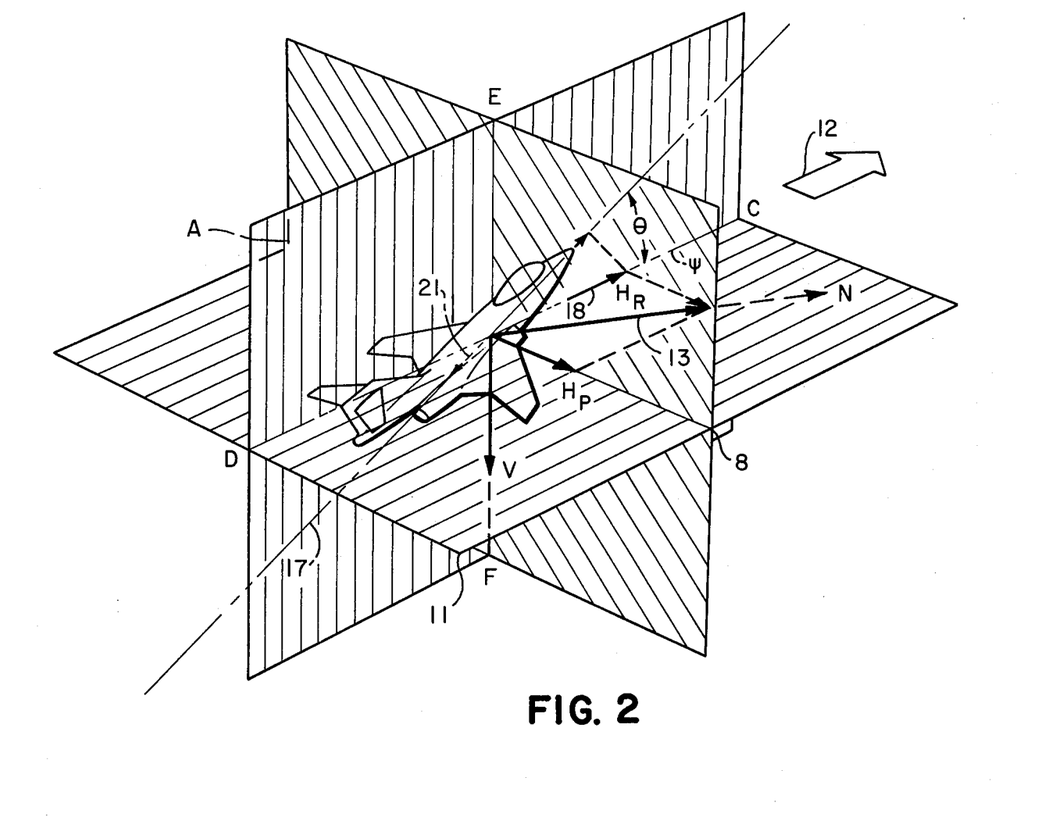
FIG. 2 is a perspective depiction of the aircraft during a climbing maneuver showing the effect of a climbing maneuver on the relationship of the magnetic field components sensed by a compass transmitter, the aircraft axes and the Earth's magnetic field.

With a "strapdown" induction compass transmitter, the transmitter is, of course, rigidly fastened to the frame of the aircraft. The plane of the transmitter sensing windings therefore tilts with the aircraft. That is, with a "strapdown" compass transmitter, the plane of the transmitter is tilted in a vertical plane as the aircraft rotates about its pitch axis while climbing or diving and is rotated about the roll axis and tilts to the aircraft bank angle as the aircraft goes into rotation about its pitch axis as in the case of a climb or a dive, is illustrated in perspective in FIG. 2. The aircraft 10 is still flying with a westerly heading with respect to magnetic North N as shown by the arrow 12. The aircraft is shown as having been rotated about its pitch axis so as to be in a climbing attitude. That is, aircraft 10 is shown with its fore/aft axis 17 rotated through an angle $\theta$ in the plane DECF so that it is no longer in level flight in the horizontal plane ABCD. The fore/aft component $H_R$ of the horizontal field component H of the Earth's magnetic field, which is shown at 18, is sensed by the induction compass transmitter which has also been rotated through the angle $\theta$. The sensed fore/aft component is reduced as a function of the cos $\theta$. The fore/aft component due to the horizontal component of the Earth's field is thus:

$$F_{\theta H} = H_R \cos \theta \tag{7}$$

With the compass transmitter tilted to the pitch angle $\theta$, it can be seen that the Earth's vertical field component is no longer perpendicular to the plane of the sensing windings and a component of the Earth's vertical field, shown at 21, is sensed along the fore/aft axis 17 of the aircraft and is equal to V sin $\theta$. In a climb the vertical field component is directed rearward and thus negative in the Northern Hemisphere, as illustrated.

Thus, $F_{\theta V} = -V \sin \theta$. The total fore/aft component sensed in the tilted plane of the compass transmitter for a positive (climb) pitch angle $\theta$ is therefore:

$$F_\theta = F_{\theta H} + F_{\theta V} = H_R \cos \theta - V \sin \theta \tag{8}$$

$$F_\theta = H \cos \Omega \cos \theta - V \sin \theta \tag{9}$$

The athwartships component A sensed by the compass transmitter is not affected by the vertical component of the Earth's field during a climb (or dive) and remains:

$$A_\theta = H_P \sin \Omega \tag{10}$$

Similarly, if the aircraft also goes into a turn and rotates through a bank angle $\phi$ the vertical component of the Earth's field is no longer perpendicular to the plane of the compass transmitter windings which measure the athwartships axis and a component of the vertical field is sensed which is proportional both to the roll or bank angle $\phi$ as well as to the pitch angle $\theta$. A component of the horizontal field along the fore/aft axis is sensed along the athwartships axis. The following relationships fully define F and A in terms of $H_R$, $H_P \phi$, $\theta$ and V for a "strapdown" induction compass transmitter during non-level turns:

$$F = H_R \cos \theta - V \sin \theta \tag{11}$$
$$A = -H_R \sin \phi \sin \theta + H_P \cos \phi - V \sin \phi \cos \theta \tag{12}$$

Equation (12) may be rewritten in terms of $H$, $V$, $\theta$ and $\phi$ as follows:

$$F = H \cos \Omega \cos \theta - V \sin \theta \tag{13}$$

$$H_P = H \sin \Omega \tag{14}$$

Using the subscript $\phi$ to designate F, A and $\Omega$ during a level turn, i.e., $\theta = 0$, then the field sensed by a "strapdown" transmitter is defined by the following equations:

$$F_\phi = H \cos \Omega \tag{15}$$

$$A_\phi = H \sin \Omega \cos \phi - V \sin \phi \tag{16}$$

$$\text{Tan } \Omega_\phi = A_\phi/F_\phi = (H \sin \Omega \cos \phi - V \sin \phi)/H \cos \Omega \tag{17}$$

$$\text{Tan } \Omega_\phi = \text{Tan } \Omega \cos \phi - (V \sin \phi/H \cos \phi) \tag{18}$$

But $V/H = \text{Tan } D$
Hence:

$$\text{Tan } \Omega_\phi = \tan \Omega \cos \phi - (\text{Tan } D \sin \phi/\cos \Omega) \tag{19}$$

The first expression on the right hand side, tan $\Omega$ cos $\phi$ represents the two cycle error in that it is a function of both the heading angle $\Omega$ and the bank or roll angle $\phi$. The second expression on the right hand side represents the vertical field error and is a function of the dip angle D, i.e., vertical field error = tan D sin $\phi$/cos $\Omega$.

Since dip angle varies with latitude from zero (0°) at the equator to 90° at the magnetic north pole, this vertical field error can vary substantially and produce heating errors which manifest themselves as turning problems. These problems, generally referred to as "Northerly Turning Errors," include heading anomalies and ambiguities if the bank angle equals or exceeds a critical value and results in oscillations about the desired heading if the bank angle is below the critical value. Briefly, if the bank angle exceeds the complement of the dip angle, it is not possible to find and indicate all headings since the compass transmitter will then only indicate headings in a limited range no matter what the actual heading is. The problem is at its most severe when attempting a turn while on a direct East (90°) or West (270°) heading. On such an East or West heading, if the bank angle exceeds the complement if the dip angle, there can be a complete reversal of the heading indication. Thus, on an East (90°) heading, a right wing down turn in which the bank angle exceeds the complement of the dip angle, causes the compass transmitter indication to reverse 180° and indicate a West (270°) heading. Similarly, while on a West (270°) heading a left wing down turn in which the bank angle exceeds the complement of the dip angle causes the compass transmitter to indicate an East (90°) heading.

If the bank angle is exactly equal to the complement of the dip angle then the output of the compass transmitter becomes indeterminate on these headings since it no longer senses any magnetic field and all heading indication is lost.

The manner in which these anomalies and ambiguities occur when the bank angle equals or exceeds the critical angle (i.e., the complement of the dip angle) will be illustrated in connection with an aircraft on an East or West heading since this represents a "worst case" situation.

For an East and West heading, the sensed fore/aft aft component F of the Earth's horizontal field obviously goes to zero, i.e., $F_\phi = 0$. For an East heading (East = 90°) the value of the sine of heading angle, i.e., sin $\Omega$ = sin 90° = + 1. For a West heading (West = 270°) sin $\Omega$ = sin 270° = − 1. Thus, on an East heading the sensed athwartships component $A_\phi$, as defined in Equation (16) becomes zero, when V sin $\phi$ = H sin $\Omega$ cos $\phi$; i.e., when the vertical field error equals and is in an opposite direction to the sensed horizontal component.

Since sin $\Omega$ = + 1 for an East heading, $A_\phi = 0$ when:

$$V \sin \phi = H \cos \phi \quad (20)$$

Transposing Equation (20) becomes $$H/V = \sin \phi / \cos \phi \quad (21)$$

By trigonometric transformation, Equation (21) becomes:

$$H/V = \tan \phi \quad (22)$$

Therefore, $$\tan \phi = \tan (90° - D) \quad (23)$$

or $$\phi = 90 - D. \quad (24)$$

In other words, for a given dip angle the induction compass transmitter heading becomes indeterminate in an East heading in the Northern Hemisphere when the bank angle is to the right and is equal to the complement of the dip angle. If $\phi > 90 - D$ then the indicated heading actually reverses 180°.

In a similar fashion, for a West heading with $\sin \Omega = -1$, then $$\tan \phi = -H/V = -\cot D = -\tan(90°) = \tan -(90° - D)$$

or $$\phi = -(90° - D)$$

In summary, in the Northern Hemisphere, indicated headings become indeterminate when flying East with a right (positive) bank angle equal to the complement of the dip angle or when flying West with a left (negative) bank angle equal to the complement of the dip angle. Increasing the bank angle so that it exceeds the complement of the dip angle results in a reversal of the polarity of the athwartships component $A_\phi$ and produces 180° error in indicated heading for the above conditions. Consequently, the indicating heading appears to modulate around West (270°) during a right turn, and to modulate around East (90°) during a left turn. This results in not being able to turn to indicated headings near East or West without first levelling down to a bank angle which is lower than the complement of the dip angle. For the mideastern U.S., where dip angle is +70°, the bank angles must therefore be less than ±20° to avoid this problem on the East/West heading.

For headings other than East or West any turns in which the bank angle exceeds the complement of the dip angle, the compass transmitter indicates only a limited and erroneous range of headings. The nature of the problem may be discerned from Tables I and II which tabulate the indicated heading vis-a-vis the actual heading in case of Table I and the magnitude and direction of the heading error in Table II for bank angles of ± 15° (below the critical angle) and ± 30° (above the critical angle) for a dip angle $D = +70°$ which represents a dip angle typical of the Eastern United States.

TABLE I

| Actual Hdg (°) | INDICATED HEADING (DEG.) | | | |
|---|---|---|---|---|
| | +15° Bank | −15° Bank | +30° Bank | −30° Bank |
| 0 | 324.58 | 35.42 | 306.05 | 53.95 |
| 45 | 357.73 | 63.11 | 312.88 | 70.40 |
| 90 | 90.00 | 90.00 | 270.00 | 90.00 |
| 135 | 182.27 | 116.89 | 227.12 | 109.60 |
| 180 | 215.42 | 144.58 | 233.95 | 126.05 |
| 225 | 243.11 | 177.73 | 250.40 | 132.88 |
| 270 | 270.00 | 270.00 | 270.00 | 90.00 |
| 315 | 296.89 | 2.27 | 289.60 | 47.12 |

TABLE II

| Actual Hdg (°) | INDICATED HEADING ERROR (DEG.) | | | |
|---|---|---|---|---|
| | +15° Bank | −15° Bank | +30° Bank | −30° Bank |
| 0 | −35.42 | 35.42 | −53.95 | 53.95 |
| 45 | −47.27 | 18.11 | −92.12 | 25.40 |
| 90 | 0.00 | 0.00 | +180.00 | 0.00 |
| 135 | 47.27 | 18.11 | 92.12 | 25.40 |
| 180 | 35.42 | 35.42 | 53.95 | 53.95 |
| 225 | 18.11 | −47.27 | 25.40 | −92.12 |
| 270 | 0.00 | 0.00 | 0.00 | ±180.00 |
| 315 | −18.11 | 47.27 | −25.40 | 92.12 |

As may be seen from Table I for a right wing down turn where the bank angle is in excess of the complement of the dip angle (i.e., ± 30°) the compass transmitter indications are limited to the range from 227° to 312°. Thus, for any actual heading from 0° to 360° the indicated headings from the compass transmitter vary over a limited (and mostly erroneous) range; i.e., limited range, roughly between a South-West (225°) and Northwest (315°) heading. Similarly, for a left wing down turn (i.e., −30°) the compass transmitter indications are limited to the range from 47° to 132°. The indicated headings in this instance are limited to a range roughly between North-East (+45°) to South-East (135°) even though the actual headings may vary through 360°. Thus, it can be seen that due to vertical field error, serious ambiguities and anomalies exist on all indicated headings from a compass transmitter when in a turn in which the bank angle exceeds the complement of the dip angle.

The indicated headings and heading errors shown in Tables I and II have values characteristic of the exemplary dip and bank angles described in connection therewith (i.e., $D = +70 \pm 15$ and $\phi = \pm 30°$). Obviously for different combinations of dip angles and bank angles, the actual indicated headng and heading error values will vary with actual dip and bank angles but the "Northerly Turning Error" ambiguities and anomalies of the type just described exist to varying degrees as long as the bank angle equals or exceeds the complement of the dip angle.

In addition to the "Northerly Turning Error" anomalies and ambiguities which occur during a turn when the bank angle equals or exceeds the complement of the dip angle, "Northerly Turning Error" also results in continuous northerly heading in the Northern Hemisphere even though the bank angle is less than the complement of the bank angle. Again, it must be stressed that the term "Northerly Turning Error" is somewhat of a misnomer as it is really a hemispherical turning error produced during turns by the Earth's vertical field and is by no means limited to the Northern Hemisphere since the same problem exists in the Southern Hemisphere when attempting to straighten out on a Southerly heading.

The nature of this oscillatory "Northerly Turning Error" can also be illustrated by reference to Table I. Let it be assumed that the system is being operated in the compass mode, i.e., not slaved to a directional gyro. For a +15° bank [i.e., a right hand turn towards North with a bank angle less than the complement of the dip angle], the plane must turn to an actual heading of approximately 45° for the compass to have an indicated heading of approximately 0° (i.e., 357.73°). Upon levelling out, however, the compass indicates the actual heading is 45° to the East of true magnetic North. This informs the pilot that a left bank turn is needed to obtain a North heading. During a subsequent −15° bank, the aircraft turns to an actual heading of approximately 315° because at that heading the indicated heading for a −15° bank is approximately 0° (i.e., 2.27°). Upon levelling out, the now correct indication of 315° will inform the pilot that he is now to the West of magnetic North and that a right bank turn is needed to obtain a North heading. Thus, an oscillatory condition exists which makes it very difficult to turn to and level out on a North heading in turns where the bank angle is less than the complement of the dip angle.

The oscillatory condition which exists as the pilot tries to turn to a northerly heading in the Northern Hemisphere is not present when turning to a southerly heading in the Northern Hemisphere. That is, the data from Table I makes it clear that this oscillatory or overshoot instability does not exist since for a southerly heading the compass indicator will show 180° before that heading is actually reached. That is, while trying to turn to a southerly heading in a Northern Hemisphere, the error introduced by the vertical component of the Earth's field causes an undershoot rather than an overshoot. As a result, although the compass transmitter gives erroneous indications which introduce some difficulties, the fact that the error results in undershoot allows the pilot, by continuing to bank, to reach the southerly heading in the Northern Hemisphere.

As has been shown previously by Equation (16) the vertical field error along the athwartships axis during a turn is $-V \sin \phi$. As a result, the indicated heading which is represented by the arc tangent of the athwartships component $A_\phi$ divided by the fore/aft component $F_\phi$, has an error term which is proportional to Tan D, i.e., the tangent of the dip angle. Since magnetic dip angle varies substantially with latitude, substantial errors in indicated heading, as shown in Table I and II are present in "Northerly Turning Error."

Applicant has found that the vertical field error can be substantially eliminated by adding a compensating signal to the compass transmitter in the form of a varying D.C. compensation signal which cancels out the vertical field error.

The Earth's vertical magnetic field component is defined as $V = M \sin D$, where M is the Earth's magnetic field and D is the dip angle. The vertical field error, $-V \sin \phi$ is therefore:

$$-V \sin \phi = -M \sin D \sin \phi \quad (25)$$

Thus, by adding a signal equal to $M \sin D \sin \phi$ to the athwartships component $A_\phi$, $A_\phi$ is modified to become $A_{\phi C}$.

This compensated signal $A_{\phi C}$ is then equal to:

$$A_{\phi C} = (M \sin \Omega \cos \phi - V \sin \phi) + M \sin D \sin \phi \quad (26)$$

$$A_{\phi C} = H \sin \Omega \cos \phi \quad (27)$$

Substituting Equation (27) which is the magnetic heading in Equation (17), the tan of $\Omega_\phi$ becomes:

$$\text{Tan } \Omega_{\phi C} = \text{Tan } \Omega \cos \phi \quad (28)$$

It can be seen from Equation (28) that the compensated indicated heading only contains a two cycle error proportional to $\Omega$ and $\phi$. This error is relatively small and does not vary with latitude. As a result, there is no error due to the Earth's vertical field component and "Northerly Turning Error" is eliminated.

Table III, below shows the indicating heading error for various bank angles and a dip angle of +70° with the introduction of a compensating signal equal to $M \sin D \sin \phi$:

TABLE III

| TURN COMPENSATED INDICATED HEADING ERROR (°) | | | | |
|---|---|---|---|---|
| Actual Hdg (°) | +15° Bank | −15° Bank | +30° Bank | −30° Bank |
| 0 | 0.00 | 0.00 | 0.00 | 0.00 |
| 45 | −0.99 | −0.99 | −4.11 | −4.11 |
| 90 | 0.00 | 0.00 | 0.00 | 0.00 |
| 135 | 0.99 | 0.99 | 4.11 | 4.11 |
| 180 | 0.00 | 0.00 | 0.00 | 0.00 |
| 225 | −0.99 | −0.99 | −4.11 | −4.11 |
| 270 | 0.00 | 0.00 | 0.00 | 0.00 |
| 315 | 0.99 | 0.99 | 4.11 | 4.11 |

As may be seen from Table III, by eliminating the vertical field errors during a turn, the only errors still present in the output of the induction compass transmitter are those due to two cycle error. However, as pointed out previously, two cycle errors tend to be relatively small and do not have the major effects that vertical field errors do. It will be apparent therefore that by providing a compensating signal which is equal to $M \sin D \sin \phi$, that the overall errors produced by a "strapdown" induction compass transmitter are reduced substantially and "Northerly Turning Error" has been effectively eliminated.

Compensation of a "strapdown" induction compass transmitter for tilt about the pitch axis while climbing or diving during straight flight, i.e., no rotation about the roll axis, may be similarly achieved. That is, in a climb or a dive during straight flight, the bank or roll angle $\phi = 0 =$ aircraft pitch angle relative to the horizontal. For this condition, using the subscript $\theta$ for the sensed fore/aft and athwartships components during a climb or dive, $F_\theta$ and $A_\theta$ are defined previously in Equations (9) and (10) are equal to:

$$F_\theta = H \cos \Omega \cos \theta - V \sin \theta \quad (29)$$

$$A_\theta = H \sin \Omega \quad (30)$$

It will be apparent from Equations (29) and (30) that in a straight climb or a dive (where the bank angle $\theta = 0$) the sensed athwartships component $A_\theta$ is not affected by the Earth's vertical field component V but the sensed fore/aft component is. As pointed out previously, the arc tangent of $\Omega$, the indicated compass transmitter heading then becomes $\Omega_\theta$.

$$\text{Tan } \psi_\theta = \frac{A_\theta}{F_\theta} = \frac{H \sin \psi}{H \cos \psi \cos \theta - V \sin \theta} \quad (31)$$

$$\text{Tan } \psi_\theta = \frac{\frac{H \sin \psi}{H \cos \psi}}{\frac{H \cos \psi \cos \theta}{H \cos \psi} - \frac{V \sin \theta}{H \cos \psi}} = \frac{\text{Tan } \psi}{\cos \theta - \frac{V}{H} \frac{\sin \theta}{\cos \psi}} \quad (32)$$

-continued $$\tan \psi_\theta = \frac{\tan \psi}{\cos \theta \frac{\tan D \sin \theta}{\cos \psi}} \tag{33}$$

From equation (33) it is apparent that again, there is a two cycle error and a vertical field error (Tan $D$ sin $\theta$/cos $\Omega$) which varies with dip angle and can introduce various heading anomalies. The heading anomalies during climbs and dives are similar in nature to those introduced during a turn but occur on different headings. These heading anomalies and ambiguities occur if the pitch angle during a climb or dive equals or exceeds a critical value. Briefly, if the pitch angle exceeds the complement of the dip angle, it is not possible to find and indicate all headings since the compass transmitter will then only indicate headings in a limited range no matter what the actual heading is. The problem is at its most severe when on a direct North (0°) or South (180°) heading. On such a North or South heading, if the bank angle exceeds the complement of the dip angle, there can be a complete reversal of the heading indication. Thus, on a North (0°), a positive pitch angle (i.e., a climb) which exceeds the complement of the dip angle, causes the compass transmitter indication to reverse 180° and indicate a South (180°) heading. Similarly, while on a South (180°) heading a negative pitch angle (i.e., a dive) which exceeds the complement of the dip angle causes the compass transmitter to indicate a North (0°) heading.

If the pitch angle is exactly equal to the complement of the dip angle then the output of the compass transmitter becomes indeterminate on these headings since it no longer senses any magnetic field and all heading indication is lost.

The manner in which these anomalies and ambiguities occur when the pitch angle equals or exceeds the critical angle (i.e., the complement of the dip angle) will be illustrated in connection with an aircraft on a North or South heading since this represents a "worst case" situation.

For a North and South heading, the sensed athwartships component A of the Earth's horizontal field obviously goes to zero, i.e., $A_\phi = 0$. For a North heading (North = 0°) the value of the cosine of the heading angle i.e., $\cos \Omega = \cos 0° = +1$. For a South heading (180°) $\cos \phi = \cos 180° = -1$. Thus, on a North heading the fore/aft component $F_\phi$ as defined in Equation (29) becomes zero when V sin $\theta = H \Omega \cos \theta$.

Since $\cos \theta = +1$ for a North heading, $F_\theta = 0$ when $$V \sin \theta = H \cos \theta \tag{34}$$

Transposing, Equation (34) becomes $$H/V = \sin \theta / \cos \theta \tag{35}$$

By trigonometric transformation, Equation (35) becomes:

$$H/V = \tan \theta \tag{36}$$

However, since $H/V = \cot D$ then $\cot D = \tan \theta$. But $\cot D = \tan(90° - D)$. Therefore, $$\tan \phi = \tan(90° - D) \tag{37}$$

or $$\phi = 90° - D. \tag{38}$$

In other words, for a given dip angle the induction compass transmitter heading becomes indeterminate in a North heading in the Northern Hemisphere when the aircraft is in a climb and the pitch angle $\theta$ is equal to the complement of the dip angle. If $\theta > 90° - D$ then the indicated heading actually reverses 180°.

In a similar fashion, for a South heading with cos $\Omega$ = −1, then $$\tan \theta = 1(H/V) = -\cot D = -\tan(90° - D)$$
$$= \tan -(90° - D) \tag{39}$$

or $$\theta = (-90° - D)$$

In summary, in the Northern Hemisphere, indicated headings become indeterminate when flying North and climbing with a pitch angle (positive) equal to the complement of the dip angle or when flying South and diving with a pitch angle (negative) equal to the complement of the dip angle. Increasing the pitch angle so that it exceeds the complement of the dip angle results in a reversal of the polarity of the fore/aft component $F_\theta$ and produces 180° error in indicated heading for the above conditions. Consequently, the indicated heading appears to modulate around South (180°) during a climb and North (0°) during a dive. This results in not being able to obtain a heading indication without first levelling down to a pitch angle which is lower than the complement of the dip angle. For the mideastern U.S., where the dip angle is approximately +70°, the pitch angle for climbs and dives must therefore be less than ± 20° to avoid this problem on a North or South heading.

In addition to the problems encountered during dives and climbs when on a North or South heading, other anomalies exist at other headings. Table IV (below) shows indicated headings and Table V below shows indicating heading errors for exemplary pitch angle values of ± 15° and ± 30° for a dip angle of 70°.

TABLE IV

| Actual Hdg (Deg) | INDICATED HEADING (DEG) | | | |
|---|---|---|---|---|
| | +15° Pitch | −15° Pitch | +30° Pitch | −30° Pitch |
| 0 | 0.00 | 0.00 | 180.00 | 0.00 |
| 45 | 92.27 | 26.89 | 137.12 | 19.60 |
| 90 | 125.42 | 54.58 | 143.95 | 36.05 |
| 135 | 153.11 | 87.73 | 160.40 | 42.88 |
| 180 | 180.00 | 180.00 | 180.00 | 0.00 |
| 225 | 206.89 | 272.27 | 199.60 | 317.12 |
| 270 | 234.58 | 305.42 | 216.05 | 323.95 |
| 315 | 267.73 | 333.11 | 222.88 | 340.40 |

TABLE V

| Actual Hdg (Deg) | INDICATED HEADING ERROR (Deg) | | | |
|---|---|---|---|---|
| | +15° Pitch | −15° Pitch | +30° Pitch | −30° Pitch |
| 0 | 0.00 | 0.00 | +180.00 | 0.00 |
| 45 | 47.27 | −18.11 | 92.12 | −25.40 |
| 90 | 35.42 | −35.42 | 53.95 | −53.95 |
| 135 | 18.11 | −47.27 | 25.40 | −92.12 |
| 180 | 0.00 | 0.00 | 0.00 | +180.00 |
| 225 | −18.11 | 47.27 | −25.40 | 93.12 |
| 270 | −35.42 | 35.42 | −53.95 | 53.95 |
| 315 | −47.27 | 18.11 | −92.12 | 25.40 |

It can be seen from Table V that for a positive pitch angle (climb) in excess of the complement of the dip angles (i.e., +30°, the compass transmitter indicated headings are limited to the range ~ 137° to 222°. Similarly, for a negative pitch angle (dive) in excess of the complement of the dip angle (i.e., −30°), the indicated headings are limited to the range 317° to 43°. This obviously introduces severe heading indication errors when in a climbing or a diving maneuver with the pitch angle exceeding the complement of the dip angle.

Applicant has found that the vertical field error can be substantially eliminated during climbs and dives by adding a D.C. compensating signal to the compass transmitter which cancels the effect of the Earth's vertical field on the compass sensing winding. The Earth's vertical field V is defined as $V = M \sin D$, where M is the Earth's magnetic field and D is the dip angle. Vertical field error $-V \sin \theta$ therefore is equal to:

$$-V \sin \theta = -M \sin D \sin \theta \tag{40}$$

Thus, by adding a signal equal to $M \sin D \sin \theta$ to the fore/aft component $F_\theta$, $F_{74}$ is modified to become $F_{\theta C}$. The compensated fore/aft component $F_{\theta C}$ is therefore defined as:

$$F_{\theta C} = (H \cos \Omega \cos \theta - V \sin \theta) + M \sin D \sin \theta \tag{41}$$

Hence, $$F_{\theta C} = H \cos \Omega \cos \theta \tag{42}$$

As a result, the arc tangent of 1 becomes:

$$\text{Tan } \theta_C = \frac{A_\theta}{F_{\theta C}} = \frac{H \sin \psi}{H \cos \psi \cos \theta} = \frac{\text{Tan } \psi}{\cos \theta} \tag{43}$$

It will be apparent from Equation (43) that the compensated indicated heading only contains a two cycle error.

By adding such a compensating signal, the indicated heading error for various bank angles at a dip angle of +70° is reduced substantially as may be seen from Table VI below:

TABLE VI

| Actual Hdg (°) | PITCH COMPENSATED INDICATED HEADING ERROR (DEG.) | | | |
|---|---|---|---|---|
| | +15° Pitch | −15° Pitch | +30° Pitch | −30° Pitch |
| 0 | 0.00 | 0.00 | 0.00 | 0.00 |
| 45 | 0.99 | 0.99 | 4.11 | 4.11 |
| 90 | 0.00 | 0.00 | 0.00 | 0.00 |
| 135 | −0.99 | −0.99 | −4.11 | −4.11 |
| 180 | 0.00 | 0.00 | 0.00 | 0.00 |
| 225 | 0.99 | 0.99 | 4.11 | 4.11 |
| 270 | 0.00 | 0.00 | 0.00 | 0.00 |
| 315 | −0.99 | −0.99 | −4.11 | −4.11 |

Table VI shows that by eliminating vertical field errors, the only errors in the output of the induction compass transmitter are those due to two cycle error. However, as may be seen from this tabulation, these errors tend to be relatively small and do not have the major effects on the heading indication that vertical field errors do. It will be apparent therefore that the overall errors produced in the output of a "strapdown" induction compass transmitter during climbs and dives are reduced substantially along with the anomalies and ambiguities associated with this condition.

Although two cycle error is relatively small since it does not vary with latitude, there may be occasions when there is a need to eliminate even this relatively minor source of heading errors. This may be achieved by processing the athwartships and fore/aft signals $A_{\phi C}$ and $F_{\theta C}$ which have been compensated for errors due to the Earth's vertical field component by modifying the corrected signal (by multiplying) to cancel the cos $\phi$ and cos $\theta$ terms.

$A_{\phi C}$ is modified to become $A_{\phi CC}$ in the following fashion:

$$A_{\phi CC} = A_{\phi C} \cdot (1/\cos \phi). \text{ Now } A_{\phi C} = H \sin \Omega \cos \phi. \tag{44}$$

Therefore, $$A_{\phi CC} = H \sin \Omega \cos \phi \cdot (1/\cos \phi) = H \sin \Omega \tag{45}$$

As a result, the arc tangent Tan $\Omega_{\phi C}$, according to Equation (28) becomes:

$$\text{Tan } \phi_{CC} = H \sin \Omega / H \cos \Omega = \text{Tan } \Omega. \tag{46}$$

Similarly, $F_{\theta C}$ is modified and becomes $F_{\theta CC}$ as follows:

$$F_{\theta CC} = F_{\theta C} \cdot (1/\cos \theta); F_{\theta C} = H \cos \Omega \cos \theta \tag{47}$$

Therefore, $$F_{\theta CC} = H \cos \Omega \cos \theta \cdot (1/\cos \theta = H \cos \Omega \tag{48}$$

As a result, the arc tangent of $\Omega_{\theta C}$ according to Equation (43) becomes:

$$\text{Tan } \Omega_{\theta CC} = H \sin \Omega / H \cos \Omega 0 = \text{Tan } \Omega \tag{49}$$

Figure 3:
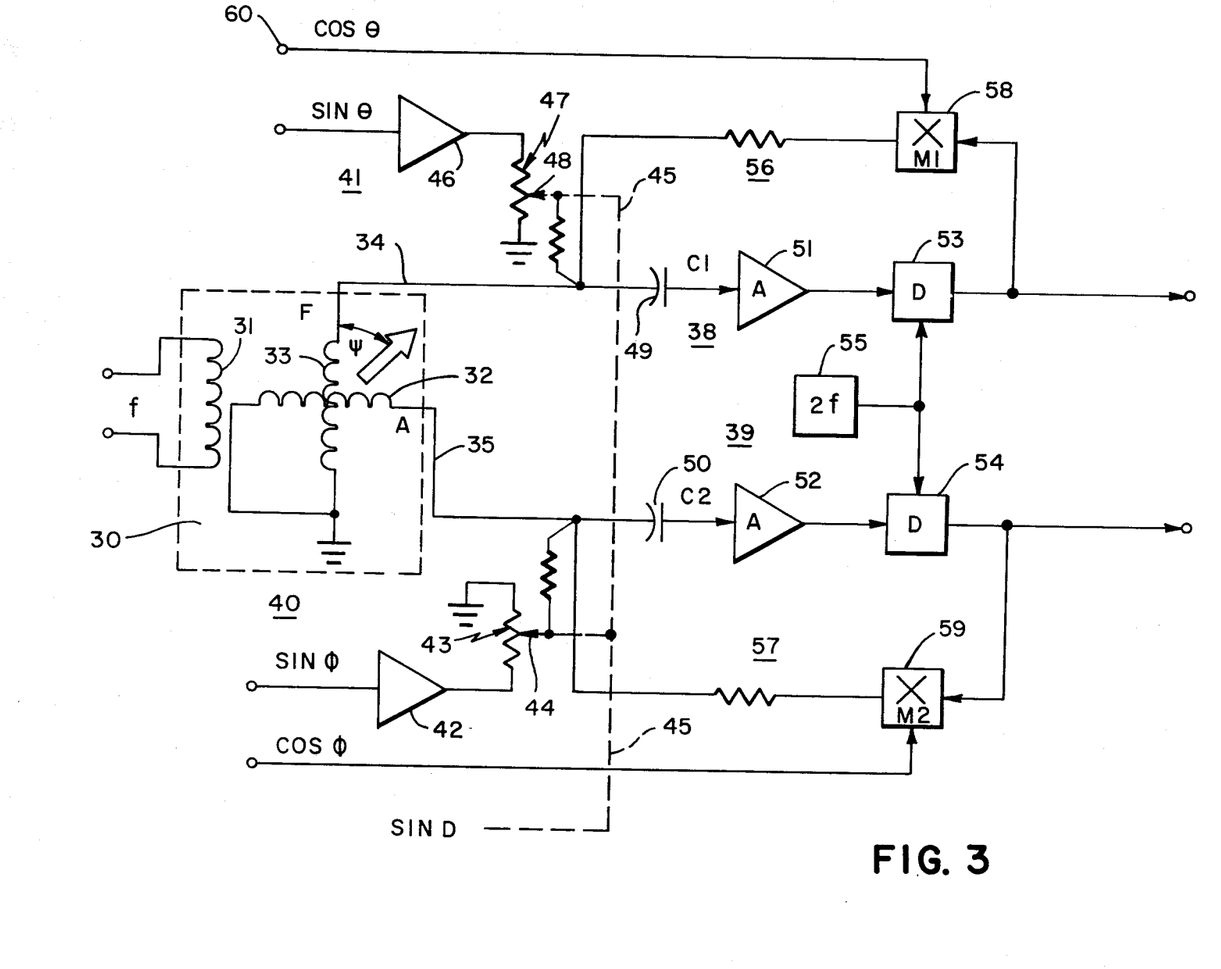
FIG. 3 is a schematic illustration of a preferred embodiment of a "strapdown" compensated compass transmitter compensated both for vertical field error and two cycle error.

As will be described in detail later, cancellation of the two cycle error terms cos $\phi$ and cos $\theta$ may be most readily achieved by multiplying the DC, negative feedback signal in a null balanced demodulating networks for the respective induction compass transmitter output windings by the compensating signals $\phi$ and cos $\theta$ FIG. 3 illustrated one embodiment of an arrangement for compensating the output of a "strapdown" induction compass transmitter both for vertical field errors and for two cycle errors during turning, climbing and diving maneuvers. In the system of FIG. 3, a compensating signal of magnitude $M \sin D \sin \phi$ is generated to compensate for errors developed in the athwartships sensing windings because of the vertical component of the Earth's magnetic field during a turn. The compensating signal drives a current through the athwartships sensing windings to cancel the vertical field error in these windings occasioned during turns. A second compensating signal proportional to cos $\phi$ is generated to compensate for two cycle error during turns. This compensating signal is injected into the negative feedback path of a null balanced demodulating network for the athwartships signal to cancel two cycle error.

Similarly, the compensating signal of magnitude $M \sin D \sin \theta$ is generated to compensate the output from the fore/aft sensing windings for errors developed during climbs or dives because of the vertical component of the Earth's magnetic field. This compensating signal drives a current through the fore/aft sensing windings to cancel the error introduced because of the Earth's vertical field. Similarly, a two cycle error compensating signal proportional to cos $\theta$ is generated to compensate for two cycle error during climbs and dives in the fore-/aft channel. This cos $\theta$ two cycle error compensating signal is injected into the negative feedback path of a null balanced demodulating network for the fore/aft signal to cancel two cycle error induced during climbing and diving maneuvers.

Thus, in the system shown in FIG. 3, a "strapdown" compass transmitter is illustrated schematically at 30. Transmitter 30 includes an excitation winding 31 having an alternating excitation voltage (commonly at 40 Hz) applied thereto to saturate a magnetic core structure twice during each excitation voltage cycle.

Field sensing windings 32 and 33 are wound on the magnetic core structure. Saturation of the core twice during each cycle of the excitation voltage results in the Earth's field inducing a second harmonic voltage proportional to the fore/aft and athwartships components of the Earth's field sensed by these windings. Windings 32 and 33 are connected in a typical resolver configuration with windings 32 sensing the athwartships component A of the Earth's horizontal magnetic field H and winding 33 sensing the fore/aft component F. The second harmonic output signals from compass transmitter 30 are applied over leads 34 and 35 as one input to junctions 36 and 37. The other inputs to summing nodes 36 and 37 are from the negative feedback paths of null balanced, demodulating channels 38 and 39 and from compensating networks 40 and 41 which respectively produce the compensating signals required to cancel vertical field errors during turns, climbs and dives.

Vertical field roll compensating network 40 produces a DC compensating signal proportional to $M \sin D \sin \phi$ to drive a compensating current through winding 32 to cancel the effects on that winding of the vertical component of the Earth's magnetic field during a turn. Pitch compensating network 41, on the other hand, produces a DC compensating signal proportional to $M \sin D \sin \theta$ to drive a compensating current through winding 33 and cancel the effect on that winding of the vertical component of the Earth's magnetic field during climbs or dives.

One input to compensating network 40 is a varying DC voltage from a vertical roll gyro which is proportional to the sine of the bank angle $\phi$. This voltage is applied to an amplifier 42 which amplifies the $\sin \phi$ signal and also introduces a scale factor proportional to the Earth's magnetic field M so that the amplified output from amplifier 42 is proportional to $M \sin \phi$. This signal is applied as a DC supply voltage for potentiometer 43 which has a movable wiper 44 controlled by a shaft 45. Wiper 44 is positioned by shaft 45 so as to insert a sin D term. The voltage at wiper 44 is therefore equal to the product of the sine of the bank angle $\phi$, the Earth's magnetic field M, and sine of the dip angle D (i.e., $V_{44} = M \sin D \sin \phi$). Wiper 44 may be set manually or alternatively may be automatically programmed as a function of latitude and and longitude with the compensation signal being generated by applying individual sin D and $M \sin \phi$ signals as inputs to a multiplier.

If the vehicle is to traverse a relatively small distance in latitude so that the dip angle stays essentially constant, the potentiometer is adjusted by positioning the wiper so that for any given bank angle the output exactly cancels the vertical field error with no further adjustment being required. If the aircraft is likely to fly over large distances so that the dip angle changes substantially, changes in the wiper position by the pilot will be necessary to maintain proper compensation. The pilot would then be supplied, in tabular or other form, with the settings of the position of the wipers for any longitude or latitude. Potentiometer 43 may be a linear potentiometer which has sinusoidal scale calibration. Alternately, a sinusoidally wound potentiometer with a linear scale may be utilized.

The output from potentiometer wiper 44 is applied through a resistor as one input to junction 37. This compensating signal, as referred to earlier, drives current through the athwartships windings 32 to produce a flux field which cancels the flux due to the vertical component of the Earth's field in a turn. As a result, any signal which might be induced in these windings due to the vertical component of the Earth's magnetic field during turns is cancelled by the current driven through the windings by a compensating signal. The output from this winding therefore represents the athwartships component of the Earth's horizontal field and contains only two cycle error.

Pitch compensating network 41 is similar to network 40 except, that an input signal proportional to the pitch angle $\theta$ during climbs and dives is the input to amplifier 46 where it is amplified and a scale factor introduced to produce an output signal proportional to $M \sin \theta$. This is again applied to a potentiometer 47 having a wiper 48 which is also controlled by shaft 45 to insert a term proportional to sin D. Thus, the output from potentiometer 47 of pitch (dive and climb) compensating network 41 is a signal proportional to $M \sin D \sin \theta$ which is introduced as one input to junction 36 to drive a DC current through fore/aft sensing windings 33 to generate a flux field which cancels flux due to the vertical component of the Earth's magnetic field during climbs and dives.

The vertical field error compensated second harmonic output signals from junctions 36 and 37 are applied to null balanced demodulator channels 38 and 39 in which the signals are demodulated. The demodulated signals are converted to negative, DC feedback currents which are driven through the respective sensing windings. The negative feedback currents produce a flux field which cancels external horizontal magnetic field H as sensed by these windings. As a result, when a null balance condition exists at the input to demodulator channels 38 and 39, the DC output voltage from demodulating channels 38 and 39 is proportional to the voltage induced in the individual compass transmitter sensing windings by the external magnetic field. That is, at null balance, the feedback current required to cancel the flux due to the external magnetic field is a measure of the external field and hence, the demodulator output voltage required to generate the null balance current is proportional to the external field.

The apparatus for obtaining a demodulated output from the induction compass transmitter using a null balancing technique is described and claimed in a copending application entitled "Null Balanced, Second Harmonic Induction Compass Transmitter", Ser. No. 729,136, filed Oct. 4, 1976 in the name of Gerald Leslie Sullivan and assigned to the General Electric Company, the assignee of the present invention. As pointed out in that application, in an induction compass transmitter, the magnitude and direction of an external field relative to the flux collectors is sensed by the windings mounted on the flux collectors whose magnetic states are biased by the external field. Biasing action results in a generation of signals in the associated windings which are proportional to the external field and take the form of second harmonic, double sideband, carrier suppressed signals. This process can be reversed and DC magnetic fields can be generated in the flux collector by supplying a DC current to the signal windings. If such a DC current is supplied to the signal windings, a similar second harmonic output will result. If the current driven through the windings is of a magnitude and polarity such as to produce a flux field which cancels the external field and nullifies the second harmonic signal which would normally be induced by the external field, then the DC current which is driven through the windings to produce the cancelling flux is a measure of the external field strength. Consequently, the DC voltage necessary to produce the cancelling DC current is similarly related to field strength.

In the null balanced, demodulating networks 38 and 39, the second harmonic output signal from the induction compass transmitter windings, after modification by the vertical field compensating signals, is used as a source of cancelling current. That is, after amplifying and demodulating the second harmonic signal from the compass transmitter, a negative feedback path from the output of the demodulator generates the DC cancelling current from the induction transmitter. To this end, the compensated output signals from induction compass transmitter 30 appearing at junctions 36 and 37 are applied through blocking capacitors 49 and 50 to high gain amplifiers 51 and 52. The gain of amplifiers 51 and 52 is high so that loop gain is high. The amplified second harmonic signals are applied as one input to a pair of synchronous demodulators 53 and 54 in the respective demodulating paths. A local, second harmonic reference carrier signal from reference signal source 55 is applied as the other input to demodulators 53 and 54. That is, if the excitation voltage for compass transmitter is a 400 Hz alternating voltage, the output signal from compass transmitter is a double sideband, suppressed carrier second harmonic signal. By reinserting a carrier signal at twice the excitation frequency, i.e., at 800 Hz, demodulators 53 and 54, demodulate the second harmonic signal to produce a varying DC voltage which represents the variations of the output from the induction compass transmitter. Thus in the case of the output from channel 38, the DC voltage is proportional to the fore/aft component of the Earth's field and the output from channel 39 is proportional to the athwarthships component of the Earth's magnetic field.

These outputs although compensated for errors introduced by the Earth's vertical field during turns in the case of channel 39 and during climbing the diving maneuvers in the case of channel 38, still contain a two cycle error component. That is, the output of channel 38 is proportional to H cos $\Omega$ cos $\theta$ while the output from channel 39 is H sin $\Omega$ cos $\phi$. The varying DC output voltages from demodulators 53 and 54 are impressed via negative feedback current paths 56 and 57 to the input of the demodulating paths, i.e., junctions 36 and 37. This DC current is also applied to sensing windings 32 and 33 and produce flux fields which cancels the external magnetic field. As a result, when a null balance condition exists, the DC output voltage from demodulators 53 and 54 are proportional to the fore/aft component in case of demodulator 53 and athwartships component in the case of demodulator 54. These DC voltages do, however, still contain two cycle error.

Compensation for two cycle error produced during turns, climbs and dives is accomplished by processing the output signals from the demodulators in the manner presently to be described. Thus, the varying DC output signals from demodulators 53 and 54 which are fed back via paths 55 and 56 have the two cycle error component cancelled in the negative feedback paths by inserting compensating signals proportional respectively to cos $\phi$ and cos 74 and multiplying the DC output from demodulators 53 and 54 by the compensating signals to eliminate two cycle error. To this end, multipliers 58 and 59 are incorporated in negative feedback paths 56 and 57. One input to multiplier 58 is the varying DC output voltage from demodulator 53 and the other input to the multiplier the signal proportional to cos $\theta$ which may be obtained from the same vertical roll gyro which provides the sin $\theta$ signal for vertical field compensation network 41. The output of multiplier 58 which is fed back to the input of the demodulating path is now a negative feedback signal which is proportional to H cos $\Omega$ so that at the null condition the output of channel 38 has been compensated both for the vertical field error and two cycle error. The output of channel 38 is therefore proportional to H cos $\Omega$ or the component of the Earth's horizonal field along the fore/aft axis of the aircraft.

Similarly, the output from channel 39 which is the athwartships field is fed back through negative feedback 57 which includes multiplier 59 which has a two cycle compensating signal proportional to cos $\phi$ applied thereto. The output signal from multiplier 59 is therefore a signal which is proportional to H sin $\Omega$, i.e., the horizontal magnetic field along the athwartships axis with two cycle error having been eliminated.

To understand the manner in which cancellation of two cycle error occurs, consider the following in connection with the signal in the athwartships demodulating path 39.

It is well known that for any amplifying network having a negative feedback path between the output and the input, the transfer function, i.e., ratio of the output to the input which, for convenience, is defined as C/R is a function of both the forward gain G and the negative feedback H. Thus, $$C/R = G/(1 + GH). \tag{50}$$

If gain in the forward direction, i.e., the amplifier gain is high so that GH is very much larger than 1, then the ratio of the input to the output signal becomes $C/R = 1/H$. If the feedback H is modified by multiplying the feedback signal by the cos of $\phi$ then $C/R = 1/(H \cos \phi)$. In other words, since the transfer function is inversely proportional to the negative feedback H, and H has been reduced by cos $\Omega$ <1, then it is obvious that the output is increased correspondingly. Hence, the sensed magnetic field signal is increased the same amount as the negative feedback is decreased. Since the negative feedback H is decreased by the two cycle error term, namely cos $\phi$, the output is increased correspondingly thereby cancelling the two cycle error which is proportional to cos $\phi$.

While a number of specific embodiments of this invention have been shown and described above, it will, of course, be understood that the invention is not limited thereto since any number of modifications both in the circuit arrangement and the instrumentalities employed therein may be made. It is contemplated by the appended claims to cover any such modifications which fall within the true spirit and scope of this invention.

What is claimed as new and desired to be secured by Letters Patent of the United States is:

1. In a strapdown induction compass transmitter system compensated for errors due to the Earth's vertical field and for two cycle errors occurring during turns and during climbing and diving maneuvers, the combination comprising:

(a) magnetic sensing means for producing a first modulated signal responsive to the strength of the Earth's magnetic field along one axis of an aircraft, and a second modulated signal responsive to the strength of the Earth's magnetic field along another axis of the aircraft, (b) means to compensate said signals for errors due to the Earth's vertical magnetic field during turns and while climbing and diving including:

(1) means to generate a first correction signal proportional to the product of the Earth's magnetic field M, the magnetic dip D, and the roll angle $\phi$, said first correction signal being equal to the vertical field error in the magnetic field sensed along one of the axes of the aircraft during a turn, (2) means to generate a second correction signal proportional to the product of the Earth's magnetic field M, the magnetic dip angle D and the pitch angle $\theta$, said second correction signal being equal to the vertical field error in the magnetic field sensed along the other axis of the aircraft during climbing and diving maneuvers, (3) means responsive to said first and second correction signals to produce flux fields which cancel the flux sensed by said magnetic sensing means along the respective axes of the aircraft due to the Earth's vertical field during turns and while climbing or diving, (c) means for demodulating the compensated first and second modulated signals including, (1) first and second demodulators each having inputs and outputs associated with the magnetic sensing means to produce respectively, first and second demodulated signals from said compensated first and second modulated signals, (2) feedback paths from the outputs to the inputs of said first and second demodulators for producing negative feedback signals, (d) and means to correct said first and second signals for two cycle error including means to reduce the negative feedback in one of said paths by a factor proportional to the cosine of the bank angle 100 and the negative feedback in the remaining paths by a factor proportional to the pitch angle $\theta$ whereby the demodulated signals from the outputs of the demodulators are increased correspondingly to cancel two cycle error.

2. The strapdown induction compass transmitter according to claim 1 wherein said first and second modulated signals from said magnetic sensing means are respectively responsive to the Earth's magnetic field along the fore/aft and athwartships axes and said first correction signal is coupled to said magnetic sensing means to produce flux to cancel the Earth's field sensed along the fore/aft axis during climbing or diving and said second correction signal is coupled to said magnetic sensing means to produce flux to cancel the Earth's field along the athwartships axis during a turn.

3. The strapdown induction compass transmitter according to claim 2 wherein the feedback in the feedback path associated with the said second demodulator is reduced by the cos $\phi$ factor and the feedback in the feedback path associated with the said first demodulators is reduced by the cos $\theta$ factor.

4. The strapdown induction compass transmitter according to claim 1 wherein the means to reduce the negative feedback includes;

(a) multiplying means in the negative feedback paths for the first and second demodulators, (b) means to apply the demodulated first and second signals to the mutlipliers in the negative feedback paths of the first and second demodulators and means to apply a signal proportional to cos $\phi$ to one of said multipliers and signal proportional to cos $\theta$ to the other multipler to reduce the negative feedbacks by cos $\phi$ and cos $\theta$.

5. The strapdown induction compass transmitter according to claim 4 wherein the signal proportional to cos $\phi$ is applied to the multiplier in the negative feedback path associated with said second demodulator and the signal proportional to cos $\theta$ is applied to the multiplier in the negative feedback path associated with said first demodulator.

* * * * *